July 31, 1945.  C. E. YOUNG BERG  2,380,818
AUTOMATIC MINIATURE ENLARGER
Original Filed Jan. 27, 1939  4 Sheets-Sheet 4
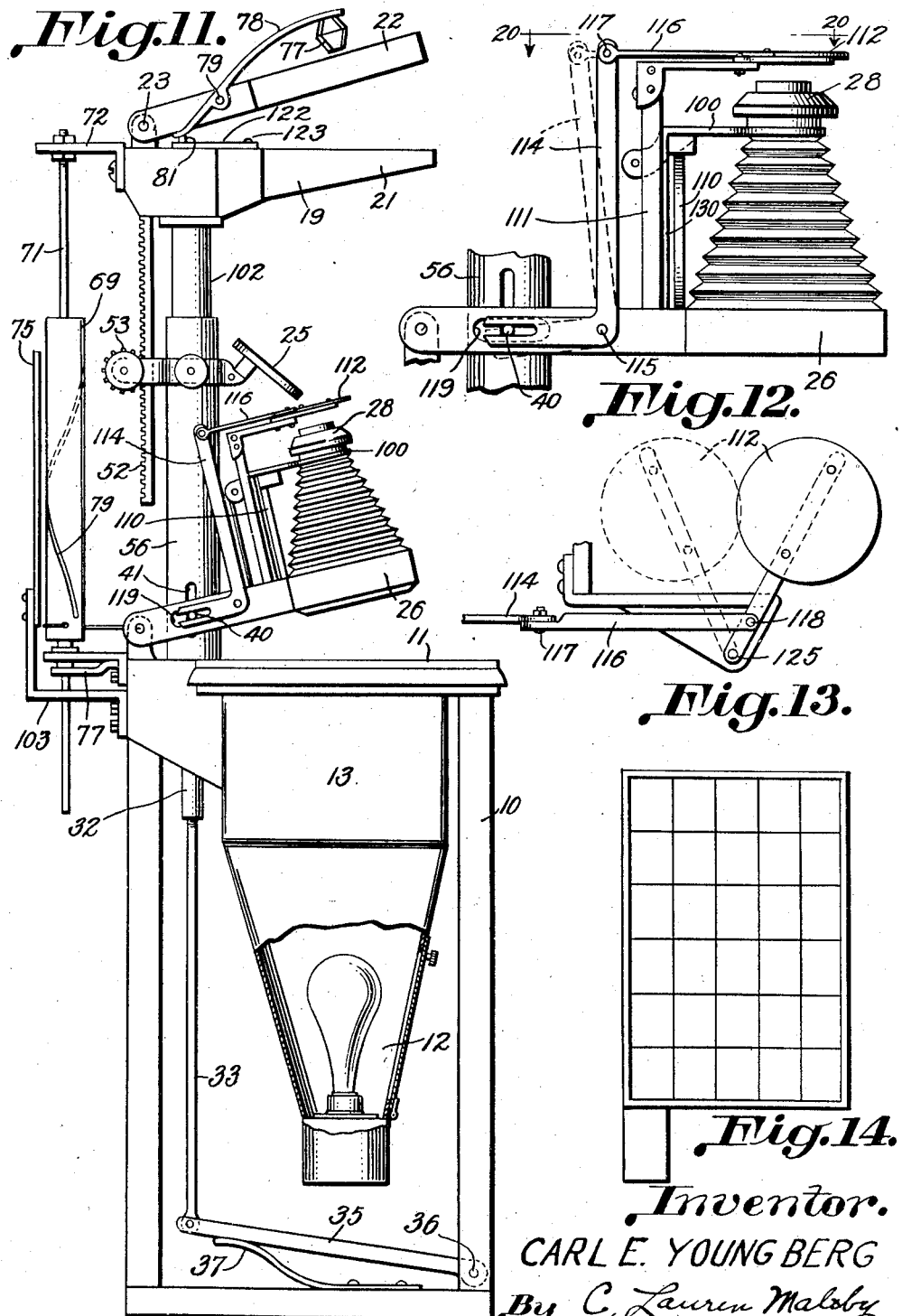
Inventor.
CARL E. YOUNGBERG
By C. Lauren Maloby
Attorney.

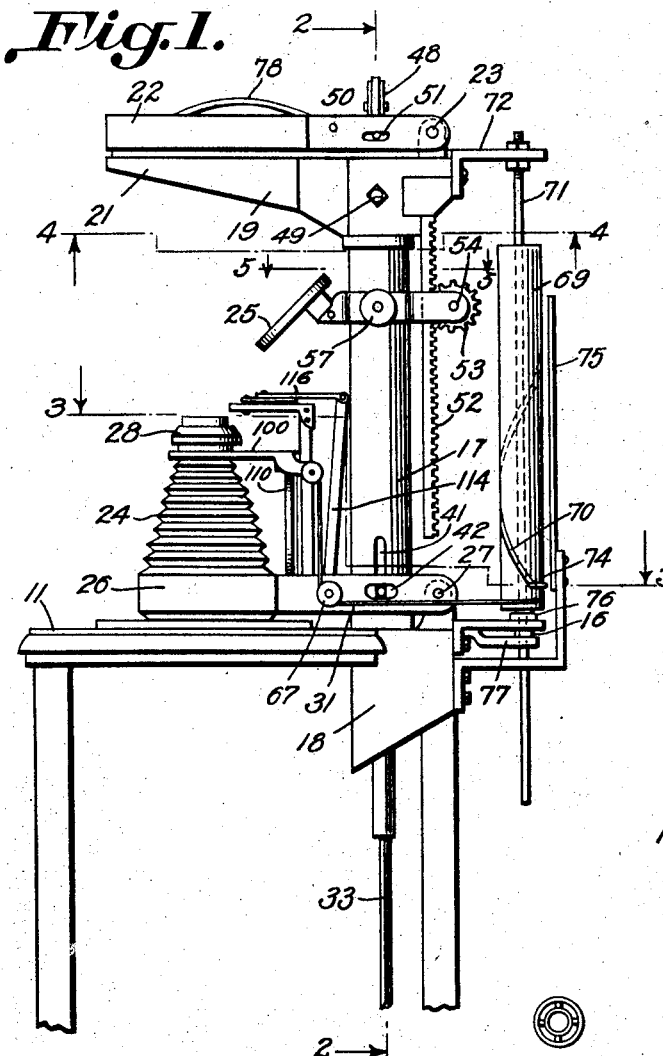

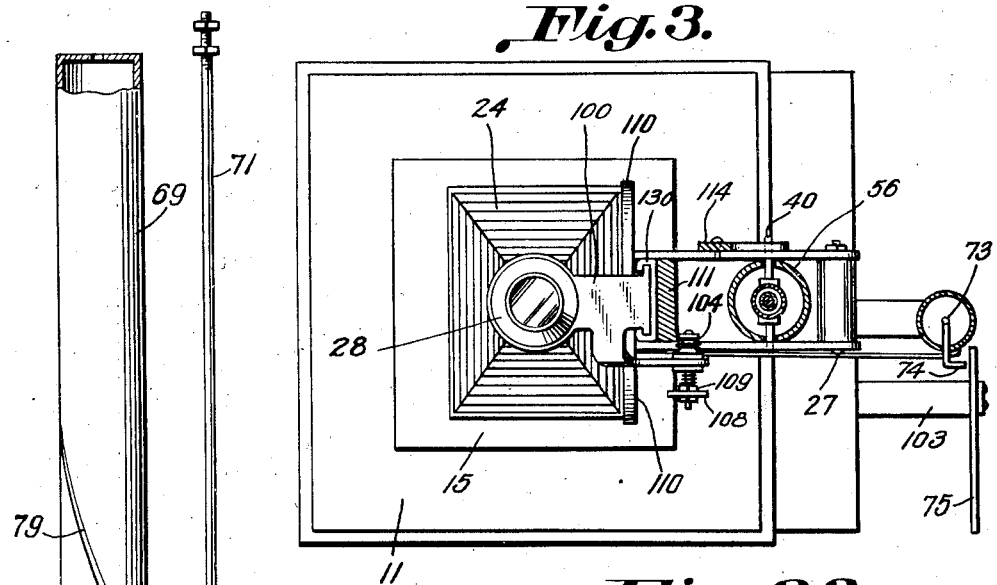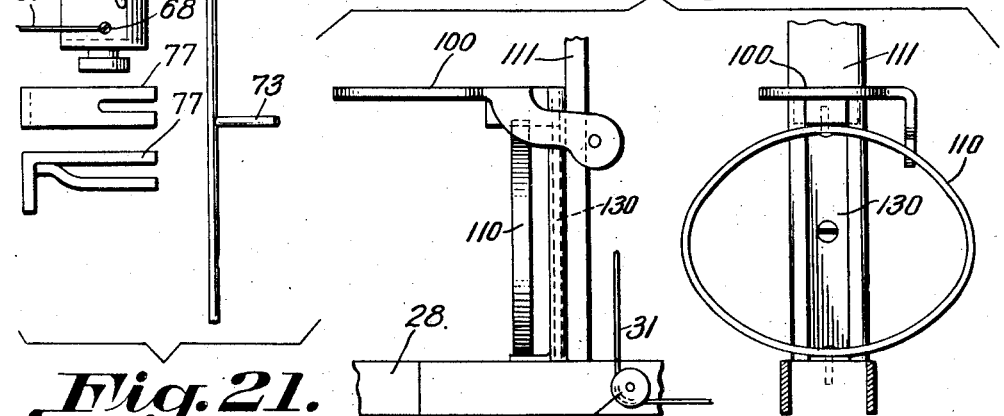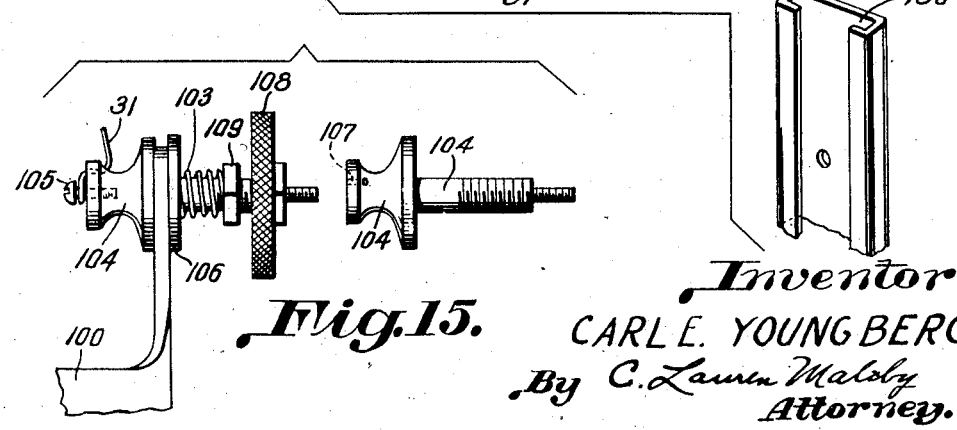

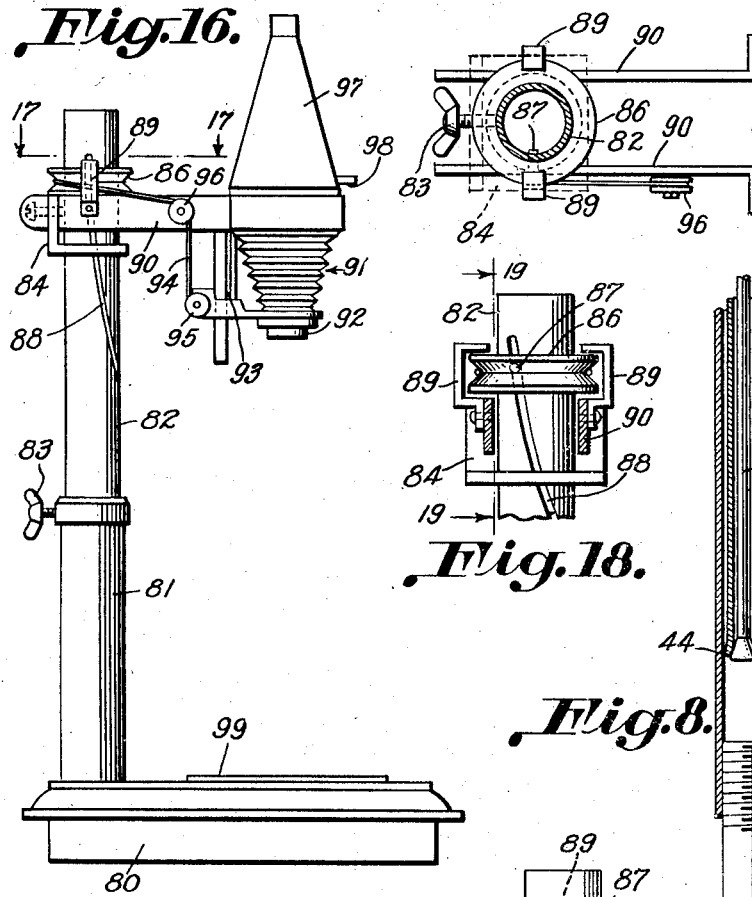

Patented July 31, 1945

2,380,818

UNITED STATES PATENT OFFICE 2,380,818

AUTOMATIC MINIATURE ENLARGER

Carl E. Young Berg, Los Angeles, Calif.

Original application January 27, 1939, Serial No. 253,190. Divided and this application August 16, 1943, Serial No. 498,863

5 Claims. (Cl. 88—24)

This invention relates to a photographic enlarging apparatus, particularly but not necessarily used in connection with miniatures, and is a division of my co-pending application, Serial No. 253,190, filed January 27, 1939 now become Patent Number 2,327,086, issued August 17, 1943.

An object of the invention is to provide such an apparatus wherein provision is made for positive automatic focus in order that rapid change of focus may be effected as desired where large quantities of miniatures or equivalents are made.

Another object is to provide a novel structure which may be adjusted so as to handle work of various sizes and proportions.

More specific objects and advantages will become apparent from a consideration of the description following, taken in connection with accompanying drawings illustrating an operative embodiment.

In said drawings:

Figure 1 is a view in side elevation showing one form of the invention, the parts being shown in printing position;

Figure 2 is a vertical section taken on the line 2—2 of Figure 1;

Figure 3 is a horizontal section taken on the line 3—3 of Figure 1;

Figure 4 is a horizontal section taken on the line 4—4 of Figure 1;

Figure 5 is a horizontal section taken on the line 5—5 of Figure 1;

Figure 6 is a detail fragmentarily showing the top of the table and mask thereon;

Figure 7 is an enlarged detail on the same plane as Figure 2 of the upper parts shown in that figure;

Figure 8 is a fragmentary, enlarged longitudinal section through a portion of the control rod;

Figure 9 is a view similar to Figure 8 but showing the parts of the control rod released;

Figure 10 is a bottom end view of the upper hollow section of the control rod;

Figure 11 is a side elevation on a smaller scale than Figure 1 showing the parts in open position;

Figure 12 is a vertical section on the plane of line 12—12 of Figure 13;

Figure 13 is an enlarged plan view of the shield means for the afterglow;

Figure 14 is an elevation of the enlargement size chart, taken on the line 14—14 of Figure 1;

Figure 15 is a detail section taken on the line 15—15 of Figure 1;

Figure 16 is a side elevation of a modified form of the invention;

Figure 17 is a horizontal section taken on the line 17—17 of Figure 16;

Figure 18 is a vertical section taken on the line 18—18 of Figure 16, and

Figure 19 is a vertical section taken on the line 19—19 of Figure 18;

Figure 20 is a vertical section taken on the line 20—20 of Figure 12;

Figure 21 shows assembly of focusing means;

Figure 22 shows assembly of camera frame and supporting parts.

Referring specifically to the drawings and first to the form disclosed in Figures 1 to 15, 10 designates a cabinet or table having a top 11 provided with a central rectangular opening therethrough adapted to be illuminated by an electric lamp or the equivalent 12 within a lamp housing 13. Over such opening in the top 11, a miniature or other negative 14 is disposed, the opening preferably being provided with a transparent glass panel on which such negative 14 rests. A mask 15 of suitable size may also rest on the glass panel, having an appropriate central opening as shown at 16, to expose the negative 14 and overlap the marginal edge portion of such negative.

Rising rigidly from the tabletop 11 is a hollow column 17. Extending into the hollow column is a tubular section 102. A platen or frame 19 for the sensitized paper or equivalent normally rests on the tubular section 102. Such platen, as best shown in Figure 4, has an opening 20 therethrough which is covered by a panel of transparent glass 21. Across the top of the glass panel 21, which panel is vertically aligned with the negative 14, a sensitized paper or equivalent is disposed when a cover or plate 22 is open as shown in Figure 11. Such cover or plate 22 is pivoted at 23 to the platen 19.

Between the top 11 and platen 19, a suitable camera device 24 is disposed and operable at the proper or correct focus, which latter is automatically maintained regardless of the position or adjustment of the parts within the operative limits.

A mirror or reflector 25 may be fastened on the column 17, to aid in the positioning of the sensitized paper on the platen 19.

Reverting to the camera 24, it is carried by a frame 26 which is pivoted at 27 to the tabletop 11. Such camera 24 may be of any conventional type, preferably having an accordion casing as shown and suitable lens means at 28. Frame 26 has a supporting post 111; attached to said post is a vertical grooved track 130. Lens means 28 has a supporting arm 100 provided with a vertical slidable lip fitting into the vertical grooved track 130. Lens means arm 100 also rests on an expansion leaf spring 101, thus keeping lens means expanded, such expansion controlled by means hereafter described. Such lens means is conventional and is manually adjustable for obtaining the correct focus by a drum 104 and operates as follows: A flexible cable or other element 31 is threaded through hole 107 and fastened securely by screw 105; screw end of drum 104 is passed through hole 108 of lens supporting arm 100. Drum 104 is held against arm 100 by adjusting nut 109, forcing spring 103 against washer 106 thus frictionally clamping arm 100 between drum 104 and washer 106. A hand wheel 108a is attached to screw end of drum 104 and is fastened rigidly by nut 110. As drum 104 is turned by hand wheel 108a to adjust the focus of lens means, cable element 31 is wound or unwound on the drum thus pulling down or releasing the lens means opposed by spring 101 and spring 103 supplies the tension necessary to hold the drum adjustably in position. When cable 31 is pulled by drum 69 drum 104 is not rotated but lens means 28 is pulled down. The connection of these means will be described later, operating to automatically maintain the proper or correct focus of the lens means 28 and camera at all times and regardless of the angle of the camera and adjustment of the parts within operative limits.

Vertically operable within the column 17 is a control rod 32 made up of a number of sections and relatively adjustable for lengthening or shortening. This control rod has a lower section 33 pivoted at 34 to a treadle 35, in turn pivoted at 36 to the table or cabinet 10 and normally maintained in uppermost position by a leaf spring 37 fastened to such cabinet. Section 33 is screw threaded or otherwise fastened at 38 to a tubular section 39 having lugs 40 projecting therefrom through elongated slots 41 in the column 17 and elongated slots 42 in the frame 26.

Extending into the tubular section 39, is a tubular section 43 which is adapted to be adjustably secured to the section 39 according to the height or position desired for the platen 19 to cover 22. The lower end of section 43 is split as at 44, Figures 8, 9 and 10, and a rod 45 is slidable in the bore of section 43 and has a tapered enlargement 46 at one end and a cam 47 pivoted to the other end at 48. Normally section 43 is slidable in section 39, but when the cam 47 is operated against the upper end of section 43, rod 45 is pulled relatively to section 43, causing the enlargement 46 to spread the lower end of section 43 into tight frictional contact with the bore wall of section 39, whereby the entire rod device 32 will operate as a unit.

Platen 19 is fastened rigidly but adjustably to the tubular section 102, as by a screw 49. The upper section of control rod 43 has lugs extending laterally therefrom through elongated slot 51 in cover plate 22.

To facilitate vertical adjustment of the platen 19, a rack bar 52 depends from the latter and is engageable by a pinion 53 carried by a manually operable shaft 54 journaled in extensions 55 in a band 56 secured to the column 17 by a screw 57. The aforesaid mirror 25 is preferably carried by said band 56.

The said lamp 12 is adapted to be under control of a switch which is opened upon downward movement of the rod 33 by a suitable means and permitted to open as said rod 33 raises, such connections being conventional.

To cut off afterglow, a shield is provided at 112, pivoted at 125 which is movable laterally over and above the lens means 28, such shield being shown in a closed position in Figure 13, and being urged to that position by a rocker arm 114, pivoted at 115, connecting with a bar 116 and pivoted at 117. The bar 116 is in turn attached to shield 112 and pivoted at 118. Rocker arm 114 has an elongated slot fitted over lug 40 of the control rod 32. At 119 is shown an elongated slot in frame 26 of sufficient depth to permit lug 40 a downward motion to force rocker arm 114 into a lateral position as shown at 120, forcing shield 112 into lateral position as shown at 121, all of which takes place with a downward motion of the camera. As the control rod 32 reaches the limit of its downward movement it contacts the light 12 and an uninterrupted illumination reaches the sensitized material on platen 19. However, when the control rod 32 returns into an upward position, it cuts off the contact of light 12, forces the rocker arm 114 to move shield 112 back into its normal position, thereby cutting off afterglow, and then contacts frame 26, lifting camera into an upward position.

Reverting to the cord or other flexible element 31, it is trained over a guide pulley or the equivalent as at 67 on the frame 26, and such cable or flexible element 31 is fastened as at 68 to a rotatable drum 69 having a cam groove 70 therein. A rod 71 is disposed centrally within the drums 69 and mounted and suspended from the platen 19 by means of a bracket 72. A projection or lug 73 extends laterally from rod 71 through the cam groove 70 and has an indicator 74 thereon movable over a chart 75 fastened by a bracket 103 to the table or cabinet 10. It will be realized that the parts are mathematically figured, constructed and arranged, so that at all adjustments and conditions of operation the indicator 74 will indicate the enlargement size of the print being made at the platen 19 on the chart 75, and that the drum 69 will co-act with the flexible element 31 so as to automatically maintain the lens and parts in proper and accurate focus. Drum 69 has a button 76 rotatably mounted in a fork 77, rod 71 depending rotatably through such button.

As the cam 47 is released, platen 19 may be raised to any desired position by rack bar 52 operated by pinion 53 on shaft 54, thus rod 71 rigidly attached to bracket 72 attached to platen 19 is forced upward, lug 73 forces drum 69 to rotate in relation to cam groove 70 to wind cable 31 thereon and pull down lens means 28 against the tension of spring 101, which is mathematically figured at the same curvature as the curvature of the lens of the camera.

In order to maintain an accurate count of orders printed and maintain all prints in relation to their respective orders, a numbering stamp 77 is provided on cover plate 22, the same being adapted for depression to be operated through contact of lever 78, and is pivoted at 79 on a bar secured to cover plate 22. Said lever 78 is rocked as the cover plate 22 closes through contact with a finger abutment screw 81 rising from an arm 122 and fastened to platen 19 at 123 and being pivoted at that point to permit a sideways motion, thereby operator can disengage or engage the operation of numbering at will.

As a result of the construction described, when treadle 35 is depressed, the control rod 32 will be moved downwardly accordingly with the lugs, 50, moving the cover 22 onto the platen 19 to secure the sensitized paper therein and also moving frame 26 and camera 24 on the axis 27 from the position of Figure 11 to the position of Figure 1, the lamp 12 being automatically lighted through the closing of the switch as control rod 43 moves downwardly. As such parts move downwardly lug 40 forces the rocker arm 114 to move shield 112 into a lateral position, permitting illumination to reach sensitized paper. During this action, as previously described, the cable 31 in combination with the drum and associated parts, will maintain the proper focus automatically. After completing exposure, lug 40 forces rocker arm 114 to move shield 112 into its normal position, thus preventing afterglow. It will be particularly noted that, regardless of the adjustment of the parts, and particularly the platen within the limits of adjustment, the focus will be automatically maintained.

Various changes may be resorted to provided they fall within the spirit and scope of the invention. For instance, the form of Figures 16 to 19 may be resorted to. In this form, a table or cabinet is provided as at 80 having a column 81 rising therefrom in which another column 82 is adjustably secured by a screw 83. A bracket 84 is adjustable along the column 82 and secured thereto through the binding engagement of a screw 85 therewith. A pulley 86 is slidable along the column 82 and rotatable on the same to a limited extent, limited through the engagement of a projection 87 on the pulley in a cam slot 88 of the column 82. Lugs 89 on arms 90 of the bracket 84 causes the pulley to follow the movement of the bracket along the column 82.

Said arms 90 are in parallelism and support a conventional camera 91 having lens means 92 at the lower end with focus adjusting means 93 of conventional form therefor. To such means 93, a cable or flexible element 94 is connected as at 95, the cable passing over a guide pulley or the like 96 fastened to one of the arms 90 and being trained over and connected at its other end to the pulley 86. A lamp housing 97 is disposed above camera 91 and a negative is adapted to be disposed at the base of the lamp housing in a suitable frame 98, and thus between the light source and the lens 92. In this instance, the sensitized paper or the like 99 is disposed on the table 80.

In the use of the device of Figures 16 to 19, the bracket and all parts carried thereby is adapted for vertical movement on the column 82 upon loosening the screw 85, in order to obtain the desired size enlargement. It will be clear that through such movement, the pulley 86 will be rotated slightly by the cable 94 as well as slide along the column, due to the co-action of the projection 87 in the cam slot 88, so that regardless of the position of the parts within operative limits, the focus will be automatically maintained.

Any adjustments necessary in the focusing in either form of the invention, as through stretching of the cables or flexible elements 31 and 94, the same may be compensated for through the adjustment of the means 29 and 93.

Having described my invention what I claim is:

1. Photographic reproducing apparatus as described comprising in combination a fixed table having a light aperture for a negative, a pedestal secured to said table, a platen having a light aperture for a positive adjustably secured for vertical movement on said pedestal, lens means and a resilient support therefor on said table, and means to vary the position of said lens with respect to said table when said platen is varied in position with respect to said table, said means including a drum on said lens support, a cable secured to said drum, a roller rotatably mounted on said table having a portion of said cable wound thereon, a cam slot in said roller, and a rod secured to said platen having a lug adapted to engage said cam.

2. Photographic reproducing apparatus as described comprising in combination a fixed table having a light aperture for a negative, a pedestal secured to said table, a platen having a light aperture for a positive adjustably secured for vertical movement on said pedestal, lens means and a resilient support therefor on said table, means to vary the position of said lens with respect to said table when said platen is varied in position with respect to said table, said means including a drum on said lens support, a cable secured to said drum, a roller rotatably mounted on said table having a portion of said cable wound thereon, a cam slot in said roller, and a rod secured to said platen having a lug adapted to engage said cam, and means to indicate the size of said positive, said last means including a scale and an indicating arm adapted to pass over said scale and secured to said cam lug.

3. Photographic reproducing apparatus as described comprising in combination a fixed table having a light aperture for a negative, a pedestal secured to said table and adapted for vertical adjustment with respect thereto and having a platen for a positive, a rack bar secured to said platen and a pinion on a manually actuated shaft to effect said adjustment, lens means and a support therefor pivotally supported on said table, a cover plate for said platen, means connected to said cover plate and lens means support adapted to raise the same for placing and removing said negative and positive, said means comprising an adjustable length rod and a spring balanced pedal, a shutter for said lens having actuating means connected to said rod so as to be actuated thereby, means for varying the position of said lens on its support when the position of said platen is varied, said last means including a drum on said lens means support, a cable on said drum, a roller pivotally mounted on said table having a portion of said cable wound thereon and having a cam slot, and a rod secured to said platen and extending through said roller having a cam engaging lug.

4. Photographic reproducing apparatus as described comprising in combination a fixed table having a light aperture for a negative, a pedestal secured to said table, a platen having a light aperture for a positive adjustably secured for vertical movement on said pedestal, lens means and a resilient support therefor on said table, and means to vary the position of said lens with respect to said table when said platen is varied in position with respect to said table, said means including a rotatable drum frictionally engaging said lens support, a cable having an end portion wound on said drum and being under tension from said resilient support, a roller rotatably mounted on said table having a portion of said cable wound thereon, a cam slot in said roller, and a rod secured to said platen having a lug adapted to engage said cam, said drum adapted to be manually rotated to wind or unwind the cable thereon to move said lens means with respect to said table.

5. Photographic reproducing apparatus as described comprising in combination a fixed table having a light aperture for a negative, a pedestal secured to said table and adapted for vertical adjustment with respect thereto and having a platen for a positive, a rack bar extending from said platen along said pedestal, a pinion engaging said rack and having a shaft bearing mounted on said pedestal, and provided with a hand wheel, lens means and a support therefor pivotally supported on said table, a cover plate for said platen, means connected to said cover plate and lens means support adapted to raise the same for placing and removing said negative and positive, said means comprising an adjustable length rod and a spring balanced pedal, means for varying the position of said lens on its support when the position of said platen is varied, said last means including a drum rotatably mounted on and having frictional engagement with said lens means support, a drum shaft having a hand wheel and a friction device, a cable wound on said drum, a hollow roller pivotally mounted on said table having a portion of said cable wound thereon and having a cam slot, and a rod secured to and oscillatable by said platen and extending through said roller and having a laterally extending cam engaging lug to rotate said roller when said rod is oscillated.

CARL E. YOUNG BERG.